United States Patent
Okochi et al.

(10) Patent No.: US 11,824,187 B2
(45) Date of Patent: Nov. 21, 2023

(54) ELECTRODE ACTIVE SUBSTANCE, METHOD FOR PRODUCING ELECTRODE ACTIVE SUBSTANCE, AND ALL-SOLID BATTERY USING ELECTRODE ACTIVE SUBSTANCE

(71) Applicant: Panasonic Intellectual Property Management Co., Ltd., Osaka (JP)

(72) Inventors: Motohiro Okochi, Osaka (JP); Akihiro Horikawa, Osaka (JP); Shuzo Tsuchida, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/745,287

(22) Filed: May 16, 2022

(65) Prior Publication Data

US 2022/0278314 A1 Sep. 1, 2022

Related U.S. Application Data

(62) Division of application No. 16/719,962, filed on Dec. 18, 2019, now abandoned.

(30) Foreign Application Priority Data

Dec. 27, 2018 (JP) ................. 2018-245624
Dec. 3, 2019 (JP) ................. 2019-218453

(51) Int. Cl.
*H01M 4/36* (2006.01)
*H01M 10/0565* (2010.01)
*H01M 4/02* (2006.01)

(52) U.S. Cl.
CPC ....... *H01M 4/364* (2013.01); *H01M 10/0565* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 7,754,382 B2 | 7/2010 | Kurihara et al. | |
| 2004/0214085 A1 | 10/2004 | Sheem | |
| 2014/0315100 A1 | 10/2014 | Wang | |
| 2016/0294004 A1 | 10/2016 | Sasaki et al. | |
| 2017/0373346 A1 | 12/2017 | Asano | |
| 2018/0069234 A1 | 3/2018 | Friend et al. | |
| 2019/0334174 A1 | 10/2019 | Hasegawa et al. | |

FOREIGN PATENT DOCUMENTS

| | | | |
|---|---|---|---|
| EP | 2 234 190 | | 9/2010 |
| JP | H08-217868 | * | 8/1996 |
| JP | 2005-051125 | | 2/2005 |
| JP | 2010-080426 | | 4/2010 |
| JP | 2016-197590 | | 11/2016 |
| JP | 2017-224459 | | 12/2017 |
| JP | 2018-006330 | | 1/2018 |
| JP | 2018-514056 | | 5/2018 |
| JP | 2018-156893 | * | 10/2018 |

OTHER PUBLICATIONS

Machine translation of JP 2018-156893, published on Oct. 4, 2018 (Year: 2018).*
Machine translation of JP H08-217868, published on Aug. 27, 1996 (Year: 1996).*
Agglomeration, Amizon Mixing Technology, date unknown.

* cited by examiner

*Primary Examiner* — Anca Eoff
(74) *Attorney, Agent, or Firm* — Wenderoth, Lind & Ponack, L.L.P.

(57) ABSTRACT

A negative electrode active substance is used for a negative electrode layer of an all-solid battery and contains a plurality of secondary particles. The plurality of secondary particles contain impregnated particles which are secondary particles having a polymer solid electrolyte region impregnated with the polymer solid electrolyte therein and an active material region.

13 Claims, 5 Drawing Sheets

| SAMPLE | MEASUREMENT | VOID RATE (%) | Thresh OR LESS | Thresh OR MORE | NOTE | IMAGE EXTRACTED IMAGE | IMAGE BINARIZATION PROCESSED IMAGE |
|---|---|---|---|---|---|---|---|
| GRAPHITE 1 | REFLECTED ELECTRON | 7.41 | 75 | - | NO CONTACT TREATMENT |  |  |
| GRAPHITE 2 | REFLECTED ELECTRON | 10.74 | 75 | - | NO CONTACT TREATMENT |  |  |
| PEO-GRAPHITE 1 | REFLECTED ELECTRON | 0.51 | 60 | - | CONTACT TREATMENT |  |  |
| PEO-GRAPHITE 2 | REFLECTED ELECTRON | 0.82 | 70 | - | CONTACT TREATMENT |  |  |

FIG. 5

| SAMPLE | CONTACT TREATMENT (BEFORE/AFTER) | CONTENT OF PEO (BY MASS%) | SOLVENT | POROSITY (%) |
|---|---|---|---|---|
| 1 | AFTER | 40 | NONE | 12 |
| 2 | AFTER | 10 | ETHANOL | 11 |
| 3 | BEFORE | - | - | 14 |

ELECTRODE ACTIVE SUBSTANCE, METHOD FOR PRODUCING ELECTRODE ACTIVE SUBSTANCE, AND ALL-SOLID BATTERY USING ELECTRODE ACTIVE SUBSTANCE

CROSS-REFERENCE TO RELATED APPLICATIONS

The present application is a divisional of application Ser. No. 16/719,962, filed Dec. 18, 2019, and claims priority to Japanese Application No. 2019-218453, filed Dec. 3, 2019 and Japanese Application No. 2018-245624, filed Dec. 27, 2018.

TECHNICAL FIELD

The technical field relates to an electrode active substance, a producing method thereof, and an all-solid battery using the electrode active substance.

BACKGROUND

In recent years, there is a demand for development of reusable secondary batteries as electronic devices such as personal computers and mobile phones become light in weight and cordless. Examples of the secondary batteries include nickel-cadmium batteries, nickel-hydrogen batteries, lead-acid storage batteries, and lithium ion batteries. Among these batteries, attention has been paid to lithium ion batteries because of their characteristics of lightweight, high voltage, and high energy density.

In the field of automobiles such as an electric vehicle or a hybrid vehicle, the development of the secondary batteries with high battery capacity is regarded as important, and demand for lithium ion batteries is increasing.

The lithium ion battery is composed of a positive electrode layer, a negative electrode layer, and an electrolyte disposed therebetween. For example, an electrolytic solution for dissolving a supporting salt such as lithium hexafluorophosphate into an organic medium, or a solid electrolyte is used as the electrolyte. Now, the lithium ion batteries widely used are flammable because an electrolytic solution containing an organic medium is used. Therefore, there is demand for materials, structures, and systems for ensuring the safety of the lithium ion batteries. With respect to the demand, by using a non-flammable solid electrolyte as the electrolyte, it can be expected that the above materials, structures, and systems can be simplified and an increase in energy density, a reduction in production costs, and an improvement in productivity can be realized. Hereinafter, a battery using the solid electrolyte is referred to as an "all-solid battery".

The solid electrolytes can be broadly divided into organic solid electrolytes and inorganic solid electrolytes. In general, the solid electrolytes used in the solid electrolyte layer and the solid electrolytes used for constituting, together with an active material, the positive electrode layer or the negative electrode layer are mainly inorganic solid electrolytes with high ion conductivity at room temperature (for example, 25° C.) Examples of the inorganic solid electrolytes include oxide-based solid electrolytes and sulfide-based solid electrolytes. The ion conductivity at 25° C. of these inorganic solid electrolytes is about $10^{-4}$ S/cm to $10^{-3}$ S/cm. JP-A-2017-224459 (Patent Literature 1) discloses an all-solid battery using an inorganic solid electrolyte for a solid electrolyte layer, a positive electrode layer, and a negative electrode layer.

SUMMARY

In the all-solid battery, the ion conductivity of the electrode active substance affects the improvement of battery characteristics. The all-solid battery disclosed in JP-A-2017-224459 aims to improve both adhesion strength of the electrode active substance and battery performance and contains a thermoplastic elastomer into which a functional group is introduced. However, JP-A-2017-224459 does not mention the ion conductivity of the electrode active substance, and the battery capacity and battery characteristics of the all-solid battery cannot be further improved.

The present disclosure has been made in view of the above problems, and an object thereof is to provide an electrode active substance with improved ion conductivity, an all-solid battery using the same, and the like.

An electrode active substance according to an aspect of the present disclosure is an electrode active substance used in a positive electrode or a negative electrode of an all-solid battery and including a plurality of secondary particles, in which the plurality of secondary particles contain impregnated particles which are secondary particles having a polymer solid electrolyte region impregnated with a polymer solid electrolyte therein and an active material region.

An all-solid battery according to an aspect of the present disclosure includes a positive electrode or a negative electrode using the electrode active substance.

A method for producing an electrode active substance according to an aspect of the present disclosure is a method for producing an electrode active substance used in a positive electrode or a negative electrode of an all-solid battery, and the method includes: preparing an electrode active substance containing a plurality of secondary particles each of which has voids therein and a polymer solid electrolyte; dissolving or dispersing the polymer solid electrolyte in a supercritical fluid to form a supercritical fluid mixture; bringing the electrode active substance into contact with the supercritical fluid mixture; and cooling and depressurizing the supercritical fluid mixture.

The present disclosure can provide an electrode active substance with improved ion conductivity, an all-solid battery using the same, and the like.

BRIEF DESCRIPTION OF THE DRAWINGS

FIG. 5 is a table showing measurement results of porosity of a plurality of secondary particles of the negative electrode active substance according to the present embodiment and the related example.

DESCRIPTION OF EMBODIMENTS

Figure 1:
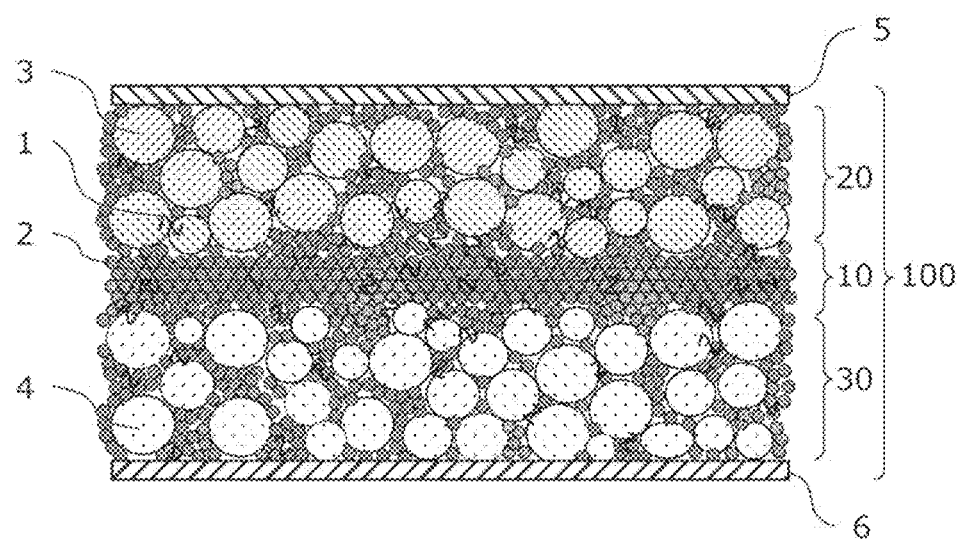
FIG. 1 is a view showing a cross-section of an all-solid battery according to the present embodiment.

An electrode active substance according to an aspect of the present disclosure is an electrode active substance used in a positive electrode or a negative electrode of an all-solid battery and including a plurality of secondary particles, in which the plurality of secondary particles contain impregnated particles, which are secondary particles, having a polymer solid electrolyte region impregnated with a polymer solid electrolyte therein and an active material region.

Accordingly, since the plurality of secondary particles of the electrode active substance contain the impregnated particles having the polymer solid electrolyte impregnated region impregnated with the polymer solid electrolyte, the polymer solid electrolyte is present even in a region where there is no active material such as voids. Thus, the polymer solid electrolyte present in the impregnated particles, which are contained in the plurality of secondary particles of the electrode active substance, acts as an ion conduction path, so that ion conductivity inhibited by the voids which is a region where there is no active material is promoted. Therefore, the ion conductivity of the electrode active substance used in the all-solid battery is improved.

In the electrode active substance, for example, a ratio of a volume of the polymer solid electrolyte region to a volume of the plurality of secondary particles may be 1% to 3%.

Accordingly, since the secondary particles contain an appropriate amount of the polymer solid electrolyte, the polymer solid electrolyte is ensured to an amount for improving the ion conductivity of the electrode active substance, and the secondary particles are less likely to aggregate due to the excess polymer solid electrolyte, so that a decrease in the ion conductivity due to aggregates can be prevented.

In the electrode active substance, for example, a ratio of the volume of the polymer solid electrolyte region to a volume of the impregnated particles may be 6.5% to 10.5%.

Accordingly, since the impregnated particles contain an appropriate amount of the polymer solid electrolyte, the polymer solid electrolyte is ensured to an amount for improving the ion conductivity of the electrode active substance and the secondary particles are less likely to aggregate due to the excess polymer solid electrolyte, so that a decrease in the ion conductivity due to aggregates can be prevented.

In addition, for example, the impregnated particles may further have voids therein.

Accordingly, since there is still room for impregnation with the polymer electrolyte, the secondary particles are less likely to aggregate due to the excess polymer solid electrolyte, so that the decrease in the ion conductivity due to aggregates can be prevented.

Further, for example, in the electrode active substance, a ratio of a volume of the voids to the volume of the impregnated particles may be 0.5% to 1.0%.

Accordingly, when the ratio of the volume of the voids is in an appropriate range, the inhibition on the ion conductivity due to the voids is prevented, and the ion conductivity is improved. In addition, since there is still room for impregnation with the polymer electrolyte, the secondary particles are less likely to aggregate due to the excess polymer solid electrolyte, so that the decrease in the ion conductivity due to larger aggregates can be prevented.

An all-solid battery according to an aspect of the present disclosure includes a positive electrode or a negative electrode using the electrode active substance.

Accordingly, since the obtained all-solid battery contains an electrode active substance with improved ion conductivity, the ion conductivity of the electrode is improved, and thus an all-solid battery having a high battery capacity and excellent battery characteristics such as charge/discharge characteristics and output characteristics can be obtained.

A method for producing an electrode active substance according to an aspect of the present disclosure is a method for producing electrode active substance used in a positive electrode or a negative electrode of an all-solid battery, and the method includes: preparing the electrode active substance material containing the plurality of secondary particles each of which has voids therein and a polymer solid electrolyte; dissolving or dispersing the polymer solid electrolyte in a supercritical fluid to form a supercritical fluid mixture; bringing the electrode active substance material into contact with the supercritical fluid mixture; and cooling and depressurizing the supercritical fluid mixture.

Accordingly, the polymer solid electrolyte is impregnated into the plurality of secondary particles by bringing the supercritical fluid mixture in which the polymer solid electrolyte is dissolved or dispersed into contact with the electrode active substance. Thus, in the secondary particles of the electrode active substance, the polymer solid electrolyte acts as an ion conduction path, so that the ion conduction inhibited by the voids is promoted. Therefore, an electrode active substance with improved ion conductivity and an all-solid battery using the same can be produced.

For example, in the method for producing an electrode active substance, the supercritical fluid may be supercritical carbon dioxide or supercritical water.

Accordingly, the supercritical fluid for dissolving or dispersing the polymer solid electrolyte can be prepared under a relatively mild condition, so that the electrode active substance according to the present disclosure can be produced with simple producing equipment.

For example, in the method for producing an electrode active substance, the supercritical fluid mixture can be produced by further adding a solvent miscible with the polymer solid electrolyte to the supercritical fluid.

Accordingly, the supercritical fluid mixture contains the solvent miscible with the polymer solid electrolyte, so that the polymer solid electrolyte becomes easy to impregnate into the secondary particles of the electrode active substance.

Hereinafter, the all-solid battery and a solid electrolyte layer, a positive electrode layer, and a negative electrode layer which constitute the all-solid battery in the present embodiment will be described in detail. It should be noted that each of the embodiments described below shows a comprehensive or specific example. Numerical values, shapes, materials, constituent elements, arrangement positions and connection forms of the constituent elements, steps, and the like shown in the following embodiments are merely examples, and the present disclosure is not intended to be limited thereto. In addition, among the constituent elements in the following embodiments, constituent elements not listed in independent claims that represent the highest level concept are described as arbitrary constituent elements.

Each figure is a schematic diagram with appropriate emphasis, omission, or ratio adjustment to show the present disclosure, is not strictly shown, and may differ in shapes, positional relationships, and ratios from the actual one. In respective figures, the substantially same components are denoted by the same reference numeral, and a repetitive description thereof may be omitted or simplified.

Embodiment

[A. All-Solid Battery]

The all-solid battery in the present embodiment will be described with reference to FIG. 1. An all-solid battery 100 in the present embodiment includes: a positive electrode layer 20 including a positive electrode collector 5 made of a metal foil and a positive electrode active substance 3 formed on the positive electrode collector 5; a negative electrode layer 30 including a negative electrode collector 6 made of a metal foil and a negative electrode active substance 4 formed on the negative electrode collector 6; and a solid electrolyte layer 10 containing a solid electrolyte 2 at least with ion conductivity and disposed between the positive electrode layer 20 and the negative electrode layer 30. The electrode active substance is used as the positive electrode active substance 3 of the positive electrode layer 20 or the negative electrode active substance 4 of the negative electrode layer 30 of the all-sol id battery 100, and contains a plurality of secondary particles. The positive electrode active substance 3 and the negative electrode active substance 4 are examples of the electrode active substance, the positive electrode layer 20 is an example of the positive electrode, and the negative electrode layer 30 is an example of the negative electrode.

The all-solid battery 100 includes a binder 1, which contains a thermoplastic elastomer to which a functional group is introduced, for adhering at least one of the positive electrode active substance 3 and the positive electrode collector 5, the positive electrode active substance 3 and the solid electrolyte 2, the positive electrode active substances 3 (particles constituting the positive electrode active substance 3), the negative electrode active substance 4 and the negative electrode collector 6, the negative electrode active substance 4 and the solid electrolyte 2, the negative electrode active substances 4 (particles constituting the negative electrode active substance 4), and the solid electrolytes 2 (particles constituting the solid electrolytes 2). In the present embodiment, the binder 1 is contained in each of the positive electrode layer 20, the negative electrode layer 30, and the solid electrolyte layer 10. The binder 1 contains the thermoplastic elastomer into which a functional group for improving the adhesion strength is introduced. In addition, the all-solid battery 100 may not contain a binder.

In the method for producing the all-solid battery 100, for example, after forming the positive electrode layer 20 containing the positive electrode active substance 3 formed on the positive electrode collector 5 made of a metal foil, the negative electrode layer 30 containing the negative electrode active substance 4 formed on the negative electrode collector 6 made of a metal foil, and the solid electrolyte layer 10 containing the solid electrolyte 2 having ion conductivity and disposed between the positive electrode layer 20 and the negative electrode layer 30, pressing is performed at for example 4 ton/cm$^2$ from the outside of the positive electrode collector 5 and the negative electrode collector 6, and a filling rate of at least one layer of respective layers is set to 60% or more and less than 100%, so as to produce the all-solid battery 100. The reason why each layer is set to a filling rate of 60% or more is as follows: since in the solid electrolyte layer 10 or in the positive electrode layer 20 or the negative electrode layer 30, the voids between materials constituting each layer are few, lithium-ion conduction and electronic conduction are often performed, and good charge/discharge characteristics are obtained. In addition, the filling rate is a proportion of the volume occupied by the material excluding the voids between the materials to the total volume.

A terminal is attached to the pressed all-solid battery 100 and the all-solid battery 100 is housed in a case. As the case of the all-solid battery 100, for example, an aluminum laminate bag, stainless steel (SUS), an iron and aluminum case, or a resin case can be used.

[B. Solid Electrolyte Layer]

First, the solid electrolyte layer 10 in the present embodiment will be described. The solid electrolyte layer 10 in the present embodiment includes the solid electrolyte 2 and the binder 1, and the functional group for improving the adhesion strength of the binder 1 reacts with and binds the solid electrolyte 2, so as to realize high adhesion strength. That is, in the solid electrolyte layer 10, the solid electrolytes 2 are in close contact with each other in high strength through the binder 1 containing the thermoplastic elastomer to which the functional group for improving the adhesion strength is introduced. The solid electrolyte layer 10 may not contain a binder, and may improve adhesion, for example, by pressing.

[B-1. Solid Electrolyte]

The solid electrolyte 2 in the present embodiment will be described. The solid electrolyte 2 can be roughly divided into a sulfide-based solid electrolyte and an oxide-based solid electrolyte, and both the sulfide-based solid electrolyte and the oxide-based solid electrolyte can be used.

The type of the sulfide-based solid electrolyte in the present embodiment is not particularly limited and examples thereof include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$. In particular, since the ion conductivity of lithium is excellent, the sulfide-based solid electrolyte preferably contains Li, P, and S. In addition, the sulfide-based solid electrolyte containing $P_2S_5$ is preferably used because reactivity between $P_2S_5$ and the binder is high and binding property between with $P_2S_5$ and the binder is high. The description of "$Li_2S$—$P_2S_5$" means a sulfide-based solid electrolyte using a material composition containing $Li_2S$ and $P_2S_5$, and the same applies to other descriptions.

In the present embodiment, the sulfide-based solid electrolyte material is, for example, a sulfide-based glass-ceramic containing $Li_2S$ and $P_2S_5$. The ratio of $Li_2S$ to $P_2S_5$ is preferably in a range of 70:30 to 80:20 for $Li_2S:P_2S_5$, and more preferably a range of 75:25 to 80:20 for $Li_2S:P_2S_5$ in terms of molar. The reason why the ratio of $Li_2S$ to $P_2S_5$ is preferably within the above range is that the ratio makes a crystal structure which has high ion conductivity while maintaining a lithium concentration that can affect the battery characteristics. Another reason is that the amount of $P_2S_5$ for reacting with and binding the binder can be easily ensured.

The oxide-based solid electrolyte in the present embodiment will be described. The type of oxide-based solid electrolyte is not particularly limited and examples thereof include LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, and $Li_{1.5}Al_{0.5}Ge_{1.5}(PO_4)_3$. The oxide-based solid electrolyte may be used alone and may be used in combination of two or more types thereof.

[B-2. Binder]

The binder 1 in the present embodiment will be described. The binder 1 in the present embodiment may contain a thermoplastic elastomer into which a functional group for improving the adhesion strength is introduced. The introduced functional group may be a carbonyl group, and from the viewpoint of improving the adhesion strength, the carbonyl group may be a maleic anhydride. Oxygen atoms of the maleic anhydride may react with the solid electrolyte 2 to bind the solid electrolytes 2 to each other via the binder 1 and a structure may be created in which the binder 1 is disposed between the solid electrolyte 2 and the solid electrolyte 2, and as a result, the adhesion strength is improved.

As the thermoplastic elastomer, for examples, styrene-butadiene-styrene (SBS) and styrene-ethylene-butadiene-styrene (SEBS) can be used. This is because the above styrene-butadiene-styrene (SBS) and styrene-ethylene-butadiene-styrene (SEBS) have high adhesion strength and also high durability in battery cycle characteristics. More preferably, a hydrogen added (hereinafter referred to as hydrogenated) thermoplastic elastomer can be used. The reason for using the hydrogenated thermoplastic elastomer is that the reactivity and the binding property are improved and the solubility into a medium used in forming the solid electrolyte layer 10 is improved.

The amount of the binder 1 added in the present embodiment is preferably in a range of, for example, 0.01% by weight or more and 5% by weight or less, more preferably 0.1% by weight or more and 3% by weight or less, and still more preferably 0.1% by weight or more and 1% by weight or less. When the amount of the binder 1 added is 0.01% by weight or more, binding through the binder 1 is easy to occur, and sufficient adhesion strength is easy to obtain. When the amount of the binder 1 added is 5% by weight or less, the battery characteristics such as charge/discharge characteristics are difficult to deteriorate, and the charge/discharge characteristics are difficult to deteriorate even when a physical property value such as hardness, tensile strength, and tensile elongation of the binder 1 changes, for example, in a low temperature region.

[C. Positive Electrode Layer]

The positive electrode layer 20 in the present embodiment will be described. The positive electrode layer 20 of the present embodiment contains the solid electrolyte 2, the positive electrode active substance 3, and the binder 1. The positive electrode layer 20 may not contain the binder 1, and may improve adhesiveness, for example, by pressing. In the positive electrode layer 20, the positive electrode active substance 3 and the solid electrolyte 2, the positive electrode active substance 3 and the positive electrode collector 5, the solid electrolyte 2 and the positive electrode collector 5, the positive electrode active substances 3, and the solid electrolytes 2 are in close contact with each other through the binder 1 containing the thermoplastic elastomer into which a functional group for increasing the adhesion strength is introduced. The ratio of the solid electrolyte 2 to the positive electrode active substance 3 is preferably within a range of 50:50 to 5:95, and more preferably in a range of 30:70 to 10:90 for solid electrolyte:positive electrode active substance in terms of weight. The reason why it is preferable to be within this range is that both a lithium-ion conduction path and an electron conduction path in the positive electrode layer 20 can be ensured easily. A conductive auxiliary such as acetylene black or Ketjen Black (registered trademark) may be added to the positive electrode layer 20.

As the positive electrode collector 5 made of a metal foil, for example, a metal foil of stainless steel (SUS), aluminum, nickel, titanium, or copper can be used.

[C-1. Solid Electrolyte]

Since it is the same as the solid electrolyte mentioned above, the description is omitted.

[C-2. Binder]

Since it is the same as the binder mentioned above, the description is omitted.

[C-3. Positive Electrode Active Substance]

The positive electrode active substance 3 in the present embodiment will be described. As the positive electrode active substance 3 in the present embodiment, for example, a lithium-containing transition metal oxide can be used. Examples of the lithium-containing transition metal oxides include $LiCoO_2$, $LiNiO_2$, $LiMn_2O_4$, $LiCoPO_4$, $LiNiPO_4$, $LiFePO_4$, $LiMnPO_4$, and a compound obtained by substituting transition metals of these compounds with one or two different elements. As the compound obtained by substituting transition metals of the compound with one or two different elements, known materials such as $LiNi_{1/3}Co_{1/3}Mn_{1/3}O_2$, $LiNi_{0.8}Co_{0.8}Co_{0.15}Al_{0.05}O_2$, and $LiNi_{0.5}Mn_{1.5}O_2$ can be used. The positive electrode active substance can be used alone, or may be used in combination of two or more types thereof.

[D. Negative Electrode Layer]

The negative electrode layer 30 in the present embodiment will be described. The negative electrode layer 30 of the present embodiment contains the solid electrolyte 2, the negative electrode active substance 4, and the binder 1. The negative electrode layer 30 may not contain the binder 1, and may improve adhesiveness, for example, by pressing. In the negative electrode layer 30, the negative electrode active substance 4 and the solid electrolyte 2, the negative electrode active substance 4 and the negative electrode collector 6, the solid electrolyte 2 and the negative electrode collector 6, the negative electrode active substances 4, and the solid electrolytes 2 are in close contact with each other through the binder 1 containing the thermoplastic elastomer into which a functional group for improving the adhesion strength is introduced. The ratio of the solid electrolyte 2 to the negative electrode active substance 4 is preferably within a range of 5:95 to 60:40, and more preferably in a range of 30:70 to 50:50 for solid electrolyte:negative electrode active substance in terms of weight. The reason why it is preferable to be within this range is that both the lithium-ion conduction path and the electron conduction path in the negative electrode layer 30 can be ensured easily. In addition, a conductive auxiliary such as acetylene black or Ketjen Black (registered trademark) may be added to the negative electrode layer 30.

As the negative electrode collector 6 made of a metal foil, for example, a metal foil of stainless steel (SUS), copper, or nickel can be used.

[D-1. Solid Electrolyte]

Since it is the same as the solid electrolyte mentioned above, the description is omitted.

[D-2. Binder]

Since it is the same as the binder mentioned above, the description is omitted.

[D-3. Negative Electrode Active Substance]

The negative electrode active substance 4 in the present embodiment will be described. As a material of the negative electrode active substance 4 in the present embodiment, for example, known materials are used, such as lithium, metals easily alloyed with lithium such as indium, tin, or silicon, carbon materials such as hard carbon or graphite, or $Li_4Ti_5O_{12}$, or $SiO_x$.

The material of the negative electrode active substance is formed into spherical secondary particles of about 1 μm to 100 μm by agglomerating and granulating scaly primary particles. In the related art, when a particle size of the active material is reduced in order to improve the energy density of the electrode, it is common to granulate primary particles refined to a submicron level and use the granulated particles as secondary particles in which primary particles are aggregated since the handling in an electrode forming step is poor. However, the negative electrode active substance formed in this way has a problem that the voids remain in the secondary particles to inhibit the ion conductivity. In particular, due to an electrode plate compression processing in the electrode forming step, the granulated secondary particles of the active material may collapse, the voids therein may diffuse, and the movement of lithium ions may be inhibited. In addition, an inorganic solid electrolyte used in the all-solid battery in the related art is in a state of being only supported around the particles of the electrode active substance without entering the voids present in the electrode active substance. Therefore, when the inorganic solid electrolyte is used, the voids remaining in the particles of the electrode active substance may inhibit the ion conductivity.

Figure 2:
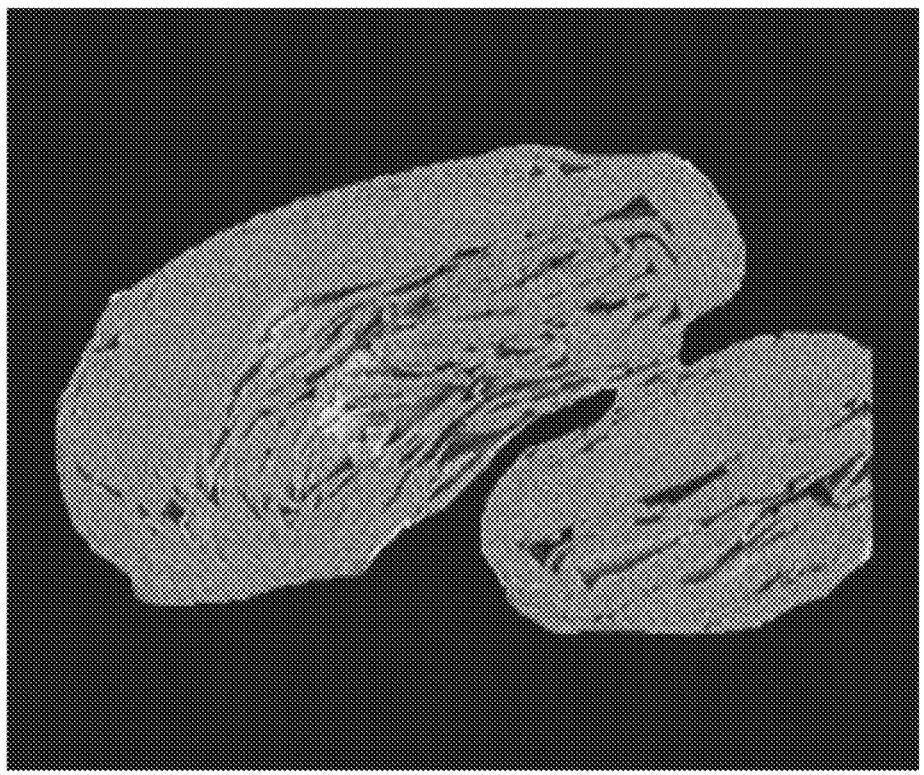
FIG. 2 is a view showing a cross-section of a negative electrode active substance in the related art.

FIG. 2 shows a scanning electron microscope (SEM) reflected electron image of a cross-section of a negative electrode active substance according to the related art. The negative electrode active substance shown in FIG. 2 is graphite, in which a relatively light color portion in the particle is the active material region and a relatively dark color portion in the particle is the void. In this way, the negative electrode active substance according to the related art has the active material region and the void therein.

In order to solve the above problem, in the negative electrode active substance 4 according to the present embodiment, the polymer solid electrolyte is impregnated (filled) into the voids of the secondary particles. In the negative electrode active substance 4, a plurality of secondary particles contain impregnated particles which are secondary particles having a polymer solid electrolyte region impregnated with the polymer solid electrolyte therein and an active material region. The plurality of secondary particles contain secondary particles obtained by aggregating primary particles of the negative electrode active substance which is an active substance material. The plurality of secondary particles may be an aggregate in which secondary particles are aggregated. The plurality of secondary particles may contain secondary particles which are not impregnated with the polymer solid electrolyte therein.

The polymer solid electrolyte in the present embodiment is not particularly limited as long as it is a solid electrolyte containing a polymer material having ion conductivity. Examples of the polymer material having ion conductivity include a polyether, a polyether derivative, a polyester, and a polyamine. Among these, the polyether is preferable from the viewpoint of ion conductivity. Examples of the polyether include polyethylene oxide, polypropylene oxide, and polymethylene ether.

Figure 3:
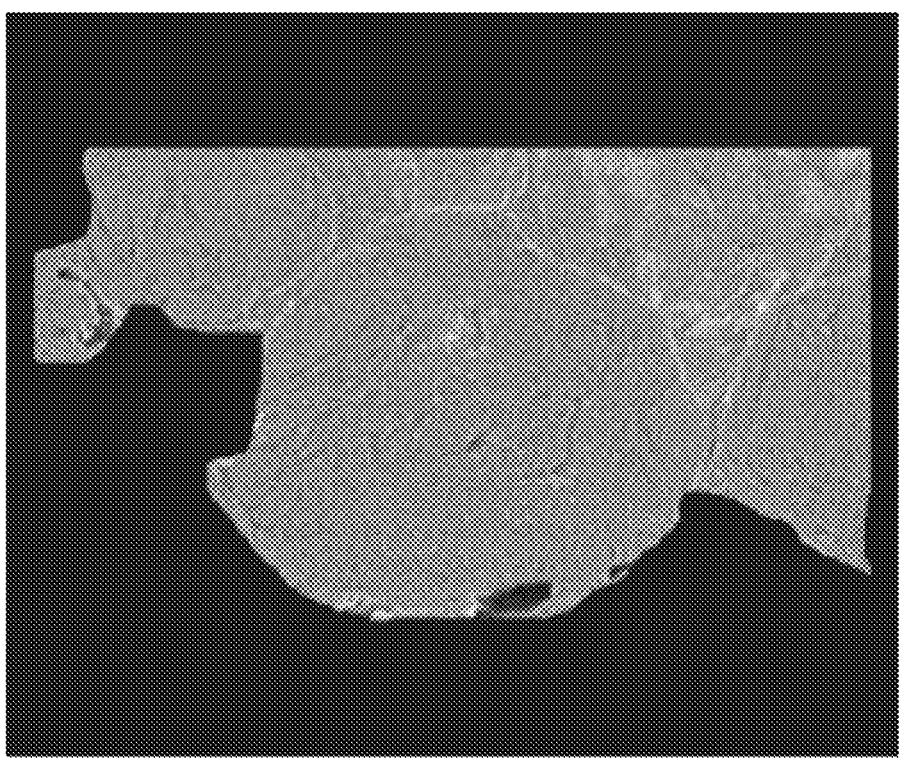
FIG. 3 is a view showing a cross-section of an impregnated particle contained in a negative electrode active substance in the present embodiment.

FIG. 3 shows an SEM reflected electron image of a cross-section of the negative electrode active substance 4 in the present embodiment. The negative electrode active substance 4 shown in FIG. 3 is graphite secondary particles impregnated with polyethylene oxide as the polymer solid electrolyte. That is, FIG. 3 shows a cross-section of the impregnated particles contained in the negative electrode active substance 4. Unlike FIG. 2, there is almost no relatively dark color portion in the impregnated particles of the negative electrode active substance 4. Thus, there is almost no void in the impregnated particles according to the present embodiment. That is, the impregnated particles contained in the negative electrode active substance 4 in the present embodiment shown in FIG. 3 has a polymer solid electrolyte region impregnated with the polymer solid electrolyte and an active material region in a portion corresponding to voids (dark color portion) in the SEM reflected electron image of FIG. 2.

[E. Method for Producing Negative Electrode Active Substance]

A method for producing the negative electrode active substance 4 according to the present embodiment is a method for producing the negative electrode active substance 4 used for the negative electrode layer 30. The method for producing the negative electrode active substance 4 includes: preparing a negative electrode active substance material containing a plurality of secondary particles each of which has voids therein and a polymer solid electrolyte; dissolving or dispersing the polymer solid electrolyte in a medium containing a supercritical fluid to form a supercritical fluid mixture; bringing the electrode active substance material into contact with the supercritical fluid mixture; and cooling and depressurizing the supercritical fluid mixture. The negative electrode active substance material is an example of the electrode active substance material.

In the negative electrode active substance 4 according to the present embodiment, the polymer solid electrolyte is impregnated in the negative electrode active substance material. A method for impregnating (filling) the polymer solid electrolyte into the secondary particles of the negative electrode active substance material can be a method of mixing the negative electrode active substance material and the polymer solid electrolyte in a powder form using a mortar, or a method of removing a medium after adding and mixing the negative electrode active substance material into a slurry in which the polymer solid electrolyte is dispersed or dissolved in any medium to bring the two into contact with each other, and a method using a medium is preferred. In particular, in order to effectively impregnate (fill) the polymer solid electrolyte into the voids in the secondary particles, a method of using a supercritical fluid or a subcritical fluid as a medium is preferred, and a method of using a supercritical fluid as a medium is more preferred.

As the supercritical fluid used as the medium for dispersing or dissolving the polymer solid electrolyte according to the present embodiment, for example, from the viewpoint of making preparation easy, supercritical water or supercritical carbon dioxide can be used. Among these, the supercritical carbon dioxide is more preferred from the viewpoint of charge/discharge cycle characteristics of the all-solid battery 100 using the negative electrode active substance 4 according to the producing method in the present embodiment.

In the present embodiment, as a method of bringing the negative electrode active substance material into contact with a mixture in which the polymer solid electrolyte is dispersed or dissolved in the medium containing the supercritical fluid or the subcritical fluid, for example, an electrode containing the negative electrode active substance material is placed on a holding table in a pressure-resistant reactor, and the polymer solid electrolyte is added to the container. Next, carbon dioxide is introduced into the container, the pressure is increased to, for example, 10 MPa by pressure adjustment, and the content is heated to 60° C. The carbon dioxide fluid that is pressurized and heated to the supercritical fluid becomes a pressurized fluid that is a supercritical fluid mixture in which the polymer solid electrolyte is dissolved or dispersed, and is brought into contact with an electrode containing the negative electrode active substance material, and the polymer solid electrolyte is impregnated on the surface of and into the negative electrode active substance material in the electrode. As another method, for example, the negative electrode active substance material and the polymer solid electrolyte are added into the pressure-resistant reactor. Next, carbon dioxide is introduced into the container, the pressure is increased to, for example, 10 MPa by pressure adjustment, and the content is heated to 60° C. The supercritical fluid mixture in which the polymer solid electrolyte is dissolved or dispersed is brought into contact with the negative electrode active substance material by mixing the carbon dioxide fluid that is a supercritical fluid, the negative electrode active substance material, and the polymer solid electrolyte, and the polymer solid electrolyte is impregnated on the surface of and into the negative electrode active substance material. Accordingly, a plurality of secondary particles of the negative electrode active substance is a plurality of secondary particles including impregnated particles having the polymer solid electrolyte region impregnated with the polymer solid electrolyte therein.

The time required for mixing in the presence of the medium containing the supercritical fluid or the subcritical fluid is sufficient as long as the polymer solid electrolyte is dissolved or dispersed and the pressure does not drop over time. The temperature and pressure during mixing in the presence of the medium containing the supercritical fluid or the subcritical fluid may be temperature and pressure required for the supercritical or subcritical of the medium used.

In the present embodiment, the temperature when the supercritical fluid mixture is brought into contact with the negative electrode active substance material is preferably 30° C. to 120° C., and more preferably 50° C. to 100° C. from the viewpoint of the solubility or dispersibility of the polymer solid electrolyte. The time for bringing the supercritical fluid mixture contact with the negative electrode active substance material is preferably 1 minute to 120 minutes, and more preferably 10 minutes to 60 minutes from the viewpoint of the charge/discharge cycle characteristics of the all-solid battery 100 using the negative electrode active substance 4 according to the producing method in the present embodiment. The pressure when the supercritical fluid mixture is brought into contact with the negative electrode active substance material is preferably 2 MPa to 20 MPa.

The medium containing the supercritical fluid or the subcritical fluid and used in the present embodiment may further contain a solvent miscible with the polymer solid electrolyte in addition to the supercritical fluid or the subcritical fluid. That is, a mixture of the supercritical fluid or the subcritical fluid with a solvent miscible with the polymer solid electrolyte may be used as a medium for impregnating the polymer solid electrolyte into the secondary particles. The solvent is not particularly limited as long as it is miscible with the polymer solid electrolyte. The solvent may be, for example, an organic solvent from the viewpoint of easily impregnating the polymer solid electrolyte into the negative electrode active substance material. Examples of the organic solvent include ketone solvents (such as acetone and methyl ethyl ketone), ether solvents (such as tetrahydrofuran, diethyl ether, ethylene glycol monoalkyl ether, propylene glycol monoalkyl ether, and cyclic ether), ester solvents (such as acetate ester, pyruvate ester, 2-hydroxyisobutyrate ester, and lactate ester), amide solvents (such as dimethylformamide), alcohol solvents (such as methanol, ethanol, isopropanol, and a fluorine-containing alcohol), aromatic hydrocarbon solvents (such as toluene and xylene) and aliphatic hydrocarbon solvents (such as octane and decane).

When using the mixture of the supercritical fluid or the subcritical fluid with the organic solvent as a medium, the content of the organic solvent based on the total weight of the supercritical fluid or the subcritical fluid and the organic solvent is preferably greater than 0% by weight and less than 90% by weight, and more preferably greater than 0% by weight and less than 50% by weight from the viewpoint of the cycle characteristics of the all-solid battery 100 using the negative electrode active substance 4 produced by the producing method in the present embodiment. Also, the content of the organic solvent based on the total weight of the supercritical fluid or the subcritical fluid and the organic solvent may be 10% by weight or more and 90% by weight or less. With the content of the organic solvent being within the above range, the organic solvent tends not to remain in the negative electrode active substance, and the negative electrode active substance material can be easily impregnated with a polymer solid electrolyte.

In the present embodiment, the content of the polymer solid electrolyte in contact with the negative electrode active substance material in the supercritical fluid or the subcritical fluid is preferably greater than or equal to the content of the polymer solid electrolyte that can be impregnated in the voids in the plurality of secondary particles of the negative electrode active substance material, and is preferably 1% by weight to 60% by weight and more preferably 10% by weight to 40% by weight with respect to the negative electrode active substance material. When the content of the polymer solid electrolyte is 1% by weight or more with respect to the negative electrode active substance material, the voids in the plurality of secondary particles of the negative electrode active substance 4 are easily filled with the polymer solid electrolyte, the inhibition of lithium-ion migration is prevented, and the battery characteristics are easily improved. When the content of the polymer solid electrolyte is 60% by weight or less with respect to a negative electrode active substance material, the remaining polymer solid electrolyte hardly remains in the plurality of secondary particles of the negative electrode active substance 4 even when the voids therein are filled, and aggregates between the secondary particles generated by the polymer solid electrolyte remaining around the plurality of secondary particles of the negative electrode active substance 4 are difficult to form.

Figure 4:
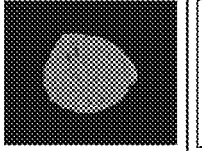
FIG. 4 is a table showing calculation results of void rate of the impregnated particle contained in the negative electrode active substance according to the present embodiment and a related example.
Figure 4:
Figure 4:
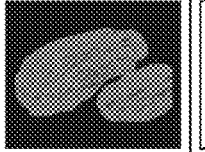
Figure 4:
Figure 4:
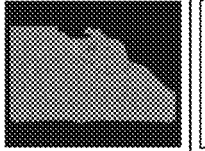
Figure 4:
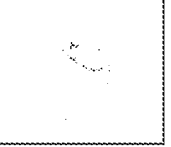
Figure 4:
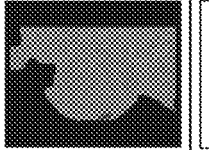
Figure 4:

FIG. 4 is a table showing calculation results of void rate of the impregnated particles contained in the negative electrode active substance in the present embodiment and a related example. FIG. 4 shows, when polyethylene oxide (hereinafter referred to as PEO) is used as the polymer solid electrolyte and graphite is used as the negative electrode active substance material, results obtained by calculating the void rate of the impregnated particles of the negative electrode active substance in the present embodiment after contact treatment with the supercritical carbon dioxide fluid in which polyethylene oxide which is a polymer solid electrolyte is dispersed or dissolved, and of the void rate of the secondary particles of the negative electrode active substance material, that is, the negative electrode active substance in the related example not subjected to the contact treatment.

As the impregnated particles, particles as impregnated particles impregnated with the polymer solid electrolyte are selected from the secondary particles contained in the plurality of secondary particles. As polyethylene oxide, one having an ion conductivity at 65° C. of $10^{-4}$ S/cm to $10^{-3}$ S/cm by coordinating oxygen molecules in polyethylene oxide to lithium ions is used. Conditions during the contact treatment include a pressure of 10 MPa, a temperature of 60° C., and a contact time of 10 minutes.

In FIG. 4, the graphite 1 and graphite 2 among the samples are secondary particles of the negative electrode active substance not subjected to treatment in the related example, and the PEO-graphite 1 and PEO-graphite 2 among the samples are the impregnated particles of the negative electrode active substance after contact treatment in the present embodiment. Specifically, FIG. 4 shows the results obtained by calculating, based on analysis of SEM reflected electron images of cross-sections of the negative electrode active substances, the void rate of the negative electrode active substance (graphite) impregnated with the polymer solid electrolyte subjected to the contact treatment and the void rate of the untreated negative electrode active substance (graphite). During the analysis of the void rate, only an arbitrary part of the particle is extracted from the SEM reflected electron image under a magnification at which the state in the secondary particle of the negative electrode active substance can be distinguished (a part other than the surrounding black part in an extracted image in FIG. 4), and a void portion which is a dark color part in the extracted part and other parts are separated by binarization processing, so that an area ratio of the void portion to the extracted portion is calculated as a void rate.

As shown in FIG. 4, the void rate of the graphite 1 and graphite 2 which are secondary particles of the untreated negative electrode active substance (graphite) is in a range of 7.0% to 11.0%, whereas the void rate of the PEO-graphite 1 and PEO-graphite 2 which are impregnated particles of the negative electrode active substance (graphite) after the contact treatment is in a range of 0.5% to 1.0%. That is, it can be seen that the void rate of the sample after the contact treatment is smaller than that of the untreated sample. It can be seen that since the void rate is decreasing, the negative electrode active substance material is brought into contact with the supercritical fluid mixture in which the polymer solid electrolyte is dispersed or dissolved, so that the polymer solid electrolyte is impregnated into the negative electrode active substance (graphite) after the contact treatment, and the impregnated particles are obtained in which the polymer solid electrolyte is impregnated into the secondary particles. That is, the amount of decrease in the void rate due to the contact treatment is the amount of impregnation of the polymer solid electrolyte into the secondary particles. Therefore, the impregnated particles contain 6.0% to 10.5% of the polymer solid electrolyte with respect to the volume of the impregnated particles. That is, the proportion of the volume of the polymer solid electrolyte region with respect to the volume of the impregnated particles is 6.0% to 10.5%. Further, in the impregnated particles, 50% or more of the volume of voids in an untreated state are impregnated with the polymer solid electrolyte due to the contact treatment.

FIG. 5 is a table showing porosity measurement results by measuring a pore distribution of the negative electrode active substances before and after a supercritical fluid treatment when the negative electrode active substance materials are brought into contact with the supercritical fluid mixture of polymer solid electrolytes. FIG. 5 shows the content of PEO with respect to the negative electrode active substance material in the supercritical fluid mixture, the solvent in the supercritical fluid mixture, and the porosity measurement result before or after the contact treatment for negative electrode active substance samples 1 to 3. The samples 1 and 2 are negative electrode active substance materials after contact treatment with a supercritical fluid mixture, and the sample 3 is a negative electrode active substance material not subjected to the contact treatment with the supercritical fluid mixture. That is, the samples 1 and 2 are negative electrode active substances in the present embodiment, and the sample 3 is a negative electrode active substance in the related example. Similar to the experiment shown in the table of FIG. 4 above, polyethylene oxide (PEG) is used as the polymer solid electrolyte, carbon dioxide is used as the supercritical fluid used in the medium, and graphite is used as the negative electrode active substance material. The contact treatment is performed at a pressure of 10 MPa, a temperature of 60° C., and a contact time of 10 minutes. The content of PEO with respect to the negative electrode active substance material in the supercritical fluid mixture used for the contact treatment in the sample 1 is 40% by weight, and the content of PEO with respect to the negative electrode active substance material in the supercritical fluid mixture used for the contact treatment in the sample 2 is 10% by weight. In addition, in the sample 2, ethanol is further added as a solvent to the carbon dioxide supercritical fluid in the supercritical fluid mixture used for the contact treatment, at an amount of 20% by weight with respect to the total weight of the supercritical fluid and ethanol. That is, in the sample 2, a mixture of the carbon dioxide supercritical fluid and the ethanol is used as the medium. The samples 1 to 3 thus prepared are measured for porosity using a mercury porosimeter (manufactured by Shimadzu Corporation). The porosity is calculated based on a porosity of pores (equivalent to voids in the secondary particles) corresponding to a pore diameter of 0.003 μm to 0.7 μm using a value with respect to the sample volume of the volume when mercury is injected into the pores corresponding to an initial pressure (pore diameter about 50 μm) by the mercury porosimeter. That is, the porosity shown in FIG. 5 is the ratio of the volume of voids in the secondary particles to the total apparent volume of the plurality of secondary particles of the negative electrode active substance.

As shown in FIG. 5, the porosities of the sample 1 and the sample 2 which are negative electrode active substances after the contact treatment are 12% and 11%, respectively, and the porosity of the sample 3 which is a negative electrode active substance before the contact treatment is 14%. Thus, the porosity is reduced by 2% to 3% by the contact treatment. The decrease in porosity is caused by the impregnation of the polymer solid electrolyte into the voids in the plurality of secondary particles of the negative electrode active substance material by the supercritical fluid treatment. That is, the plurality of secondary particles of the negative electrode active substance 4 after the treatment in the present embodiment contain 2% to 3% of the polymer solid electrolyte with respect to the volume of the plurality of secondary particles. That is, the ratio of the volume of the polymer solid electrolyte region to the volume of the plurality of secondary particles is 2% to 3%. The ratio of the volume of the polymer solid electrolyte region to the volume of the plurality of secondary particles may be 1% to 3%.

In addition, in the sample 2, the content of PEO with respect to the negative electrode active substance material in the supercritical fluid mixture used for the contact treatment is 10% by weight, which is lower than the content of PEO with respect to the negative electrode active substance material in the sample 1 of 40% by weight. However, the porosity of the sample 2 is 11%, which is lower than the porosity of the sample 1 of 12%. This is because when a medium containing ethanol is used as a solvent miscible with the PEO which is a polymer solid electrolyte in the supercritical fluid mixture, the impregnation of the polymer solid electrolyte into the negative electrode active substance is promoted.

By using the negative electrode active substance 4 in the present embodiment, the polymer solid electrolyte impregnated in the voids remaining in the secondary particles functions as an ion conduction path. Therefore, the ion conduction resistance due to the voids in the negative electrode active substance 4 before impregnation treatment can be reduced, and an all-solid battery having a high battery capacity and excellent battery characteristics such as charge/discharge characteristics and output characteristics can be provided.

Other Embodiments

The present disclosure is not limited to the above embodiment. The above embodiment is merely an example, and anything having substantially same configuration and having same functions and effects as the technical idea in the technical scope of the present disclosure is included in the scope described in the claims in the present disclosure. Further, various modifications conceived by those skilled in the art to the embodiment or other forms constructed by combining some components in the embodiment are also included in the scope of the present disclosure, unless departing from the spirit of the present disclosure.

The all-solid battery according to the present disclosure is expected to be applied to various batteries such as a power source for portable electronic devices and a vehicle-mounted battery.

What is claimed is:

1. A method for producing an electrode active substance used for a positive electrode or a negative electrode of an all-solid battery, the method comprising:
   preparing an electrode active substance material containing
      a plurality of secondary particles each of which has voids therein, and
      a polymer solid electrolyte;
   dissolving or dispersing the polymer solid electrolyte in a supercritical fluid to form a supercritical fluid mixture;
   bringing the electrode active substance material into contact with the supercritical fluid mixture such that the voids in the plurality of secondary particles are impregnated with the polymer solid electrolyte; and
   cooling and depressurizing the supercritical fluid mixture,
   wherein the content of polymer solid electrolyte in the supercritical fluid is greater than the content of polymer solid electrolyte than can be impregnated in the voids.

2. The method for producing an electrode active substance according to claim 1, wherein
   the supercritical fluid is supercritical carbon dioxide or supercritical water.

3. The method for producing an electrode active substance according to claim 1, wherein
   the supercritical fluid mixture is formed by adding a solvent having compatibility with the polymer solid electrolyte to the supercritical fluid.

4. The method for producing an electrode active substance according to claim 1, wherein
   the supercritical fluid contains 1% by weight to 60% by weight of the polymer solid electrolyte with respect to the electrode active substance material.

5. The method for producing an electrode active substance according to claim 1, wherein
   the supercritical fluid contains 10% by weight to 40% by weight of the polymer solid electrolyte with respect to the electrode active substance material.

6. The method for producing an electrode active substance according to claim 1, wherein
   the plurality of secondary particles are impregnated by the method such that the plurality of secondary particles has a void rate of 0.5% to 1.0%.

7. The method for producing an electrode active substance according to claim 1, wherein
   the plurality of secondary particles are impregnated by the method such that the plurality of secondary particles contain 6.5% to 10.5% of the polymer solid electrolyte with respect to the volume of impregnated particles.

8. A method for producing an electrode active substance used for a positive electrode or a negative electrode of an all-solid battery, the method comprising:
   preparing an electrode active substance material containing
      a plurality of secondary particles each of which has voids therein, and
      a polymer solid electrolyte;
   dissolving or dispersing the polymer solid electrolyte in a supercritical fluid to form a supercritical fluid mixture;
   bringing the electrode active substance material into contact with the supercritical fluid mixture such that the voids in the plurality of secondary particles are impregnated with the polymer solid electrolyte; and
   cooling and depressurizing the supercritical fluid mixture,
   wherein the plurality of secondary particles are impregnated by the method such that the plurality of secondary particles has a void rate of 0.5% to 1.0%.

9. The method for producing an electrode active substance according to claim 8, wherein
   the supercritical fluid is supercritical carbon dioxide or supercritical water.

10. The method for producing an electrode active substance according to claim 8, wherein
    the supercritical fluid mixture is formed by adding a solvent having compatibility with the polymer solid electrolyte to the supercritical fluid.

11. The method for producing an electrode active substance according to claim 8, wherein
    the supercritical fluid contains 1% by weight to 60% by weight of the polymer solid electrolyte with respect to the electrode active substance material.

12. The method for producing an electrode active substance according to claim 8, wherein
    the supercritical fluid contains 10% by weight to 40% by weight of the polymer solid electrolyte with respect to the electrode active substance material.

13. The method for producing an electrode active substance according to claim 8, wherein
    the plurality of secondary particles are impregnated by the method such that the plurality of secondary particles contain 6.5% to 10.5% of the polymer solid electrolyte with respect to the volume of impregnated particles.

* * * * *